Oct. 3, 1967  J. L. BIES ETAL  3,345,111
SYSTEM FOR DISPENSING MATERIALS
Filed May 25, 1966
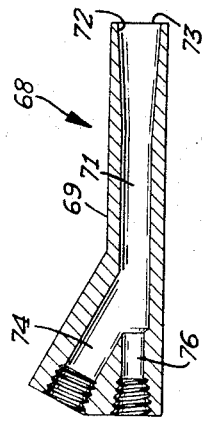
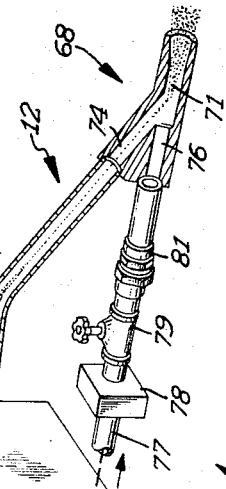
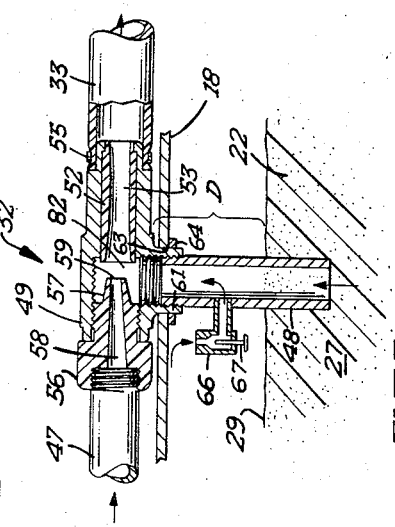
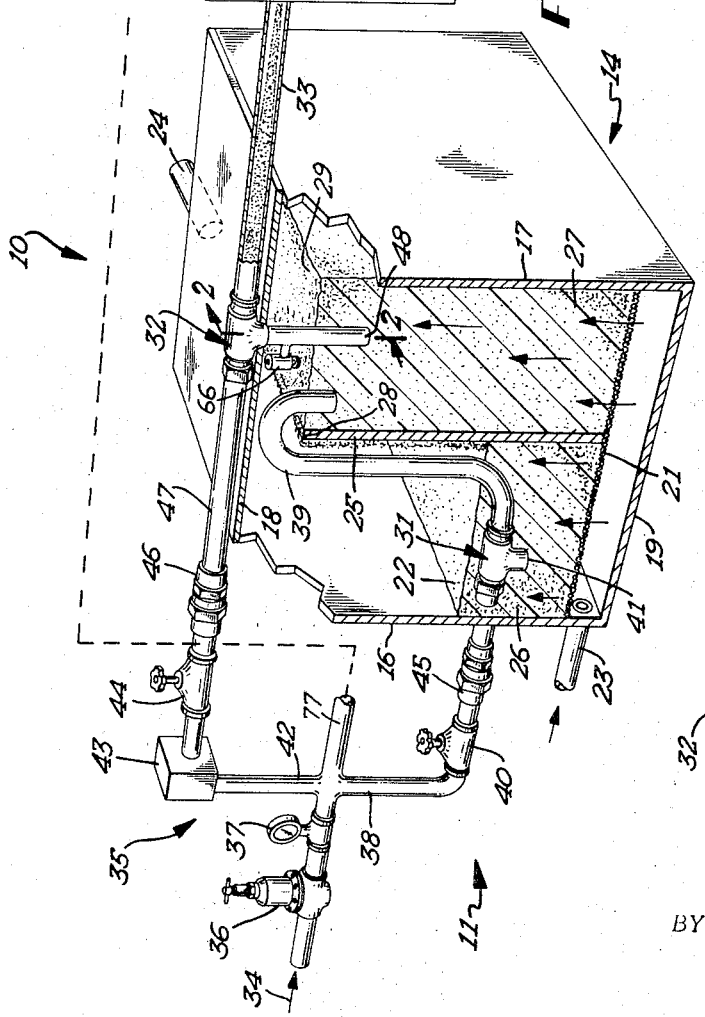
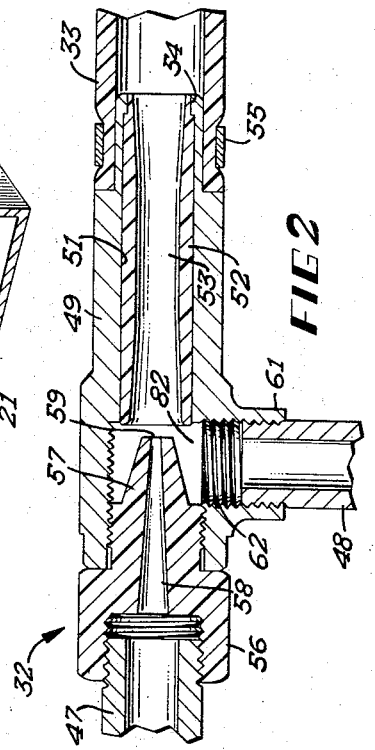
INVENTORS
JOHN L. BIES,
GENE M. LARSON
BY
Braddock+Burd
ATTORNEYS United States Patent Office 3,345,111
Patented Oct. 3, 1967

3,345,111
SYSTEM FOR DISPENSING MATERIALS
John L. Bies, Golden Valley, and Gene M. Larson, Hopkins, Minn., assignors to Possis Machine Corporation, Minneapolis, Minn., a corporation of Minnesota
Filed May 25, 1966, Ser. No. 552,737
12 Claims. (Cl. 302—17)

ABSTRACT OF THE DISCLOSURE

An apparatus and method for transporting and dispensing air suspended finely divided epoxy resin through a nozzle. The apparatus includes a tank having two chambers divided by an upright baffle wall. Air is introduced into the bottom of each chamber to suspend the epoxy resin particles in upwardly moving air streams. A venturi pump in the first chamber moves the suspended epoxy resin from the first chamber into the second chamber at a rate to maintain a constant level of suspended epoxy resin in the second chamber. A second venturi pump withdraws the suspended epoxy resin from the second chamber and discharges the suspended epoxy resin into the air stream which carries the epoxy resin to the nozzle. The second pump has a air restriction valve in the inlet line which introduces air into the epoxy resin delivered to the pump to insure an even flow of epoxy resin through the pump. The nozzle has a separate source of air under pressure to assist in moving the suspended epoxy resin through the nozzle.

Briefly described, the material transporting and dispensing system of this invention comprises a tank or container having a first reservoir chamber and a second supply chamber for storing fluid material, as finely divided epoxy resin carried in moving air so that the resin is similar to a colloidal suspension of particulate material. The fluid material is moved from the reservoir chamber to the supply chamber by a first material transporting means operable to maintain a selected level of fluid material in the supply chamber. A second material transporting means is operable to withdraw fluid material from the supply chamber at a rate which does not exceed the rate of fluid material introduced into the supply chamber by the first material transporting means. This enables the first material transporting means to maintain a substantially constant level of fluid material in the supply chamber.

The second material transporting means has an inlet passage in communication with the fluid material in the supply chamber and a pump unit drawing fluid material through the inlet passage and discharging the fluid material through an outlet passage connected to nozzle means used to direct the fluid material to a selected location. The pump unit is located at a selected distance above the level of material in the supply chamber providing the pump unit with a minimum constant suction head. A restrictor valve is used to allow a limited amount of air to flow into the inlet passage to insure the even flow of fluid material through the pump unit. In use the second transporting means is operable to move fluid material from the supply chamber at a substantially continuous and even flow rate to the nozzle means and discharge the material from the nozzle means as a continuous stream of fluid material.

The pattern of the fluid material discharged by the nozzle means is controlled by providing the nozzle means with a separate supply of air under pressure to assist in moving the fluid material through the nozzle means. The dispersion pattern of the fluid material discharged from the nozzle means can be changed by regulating the rate of flow of air introduced into the nozzle means.

In the drawings:

FIGURE 1 is a perspective diagrammatic view partly in section of the fluid material transporting and dispensing system of this invention;
FIGURE 2 is an enlarged longitudinal sectional view of the pump unit taken along line 2—2 of FIGURE 1;
FIGURE 3 is a longitudinal sectional view of the venturi pump unit and fluid material inlet control for the pump unit; and
FIGURE 4 is an enlarged longitudinal sectional view of the discharge nozzle of FIGURE 1.

Referring to the drawing there is shown in FIGURE 1 a fluid material transporting and dispensing system indicated generally at 10 for discharging continuous and uniform concentrations of fluid material to a particular location. The fluid material is capable of flowing and may include liquids, aerosols, and particulate powdered solids. To illustrate one use of fluid material transporting and dispensing system 10, the fluid material is a finely divided epoxy resin which is sprayed onto heated surfaces of an electrical machine part to coat and insulate the surfaces of the part with the resin.

System 10 has a material transporting means indicated generally at 11 operable to move fluid material through a material discharge means 12 positioned within a spray chamber having a wall 13. The part (not shown) to be coated with the fluid material is located in the spray chamber generally in alignment with the discharge end of material discharge mean 12. Material transporting means 11 has a box shaped housing or tank 14 having upright side walls 16 and 17, a top wall 18 and a bottom wall 19. A horizontally disposed filter 21 is attached to lower portions of side walls 16 and 17 and spaced from bottom wall 19. Fluid material 22, as finely divided epoxy resin, is suspended in moving air above horizontal filter 21. Filter 21 may be made of ceramic material having a plurality of very small vertical holes which permits air under pressure to move upwardly through fluid material 22 as indicated by the vertical arrows. A continuous supply of air is supplied to the bottom of housing 14 below filter 21 through an air inlet 23 connected to a source of air under pressure. The air uniformly moves through the holes in filter 21 causing fluid material 22 to float or be carried by the air so that it is similar to a colloidal suspension of particulate material. The air continuously flows upward through fluid material 22 in the housing and is discharged to the atmosphere through an outlet passage 24 into the top section of the housing.

A flat upright wall or partition 25 located within housing 14 divides the enclosed space in the housing into a reservoir chamber 26 and a supply chamber 27. Partition 25 has an elongated horizontal top edge 28 located closely adjacent the bottom side of top wall 18. Partition 25 with its top edge 28 is used to fix the level or top surface 29 of fluid material in supply chamber 27. In use partition 25 functions as a weir to maintain level 29 a substantially constant fixed distance below top wall 18.

Material transporting means 11 has a first pump unit 31 located in reservoir chamber 26 for transporting fluid material from reservoir chamber 26 into supply chamber 27. A second pump unit indicated generally at 32 is used to remove fluid material from supply chamber 27 and discharge the fluid material as a continuous stream to material discharge means 12 which dispenses this material to a particular location. A tubular conduit 33, as a plastic hose, is used to couple pump unit 32 to material discharge means 12.

Pump units 31 and 32 are identical venturi ejectors which operate with flowing air under pressure from a source 34 of air pressure. An air pressure and flow system indicated generally at 35 is used to control the pressure and flow of air to the pump units 31 and 32. Air pressure and flow system 35 comprises a pressure regulator 36 used to adjust the air pressure and to keep the air pressure in the system substantially constant. Downstream from regulator 36 is a pressure gauge 37. A pipe 38 connects gauge 37 to a metering valve 40 used to control the rate of flow of air to pump unit 31. A check valve 45 interposed in the conduit between metering valve 40 and pump unit 31 prevents reverse flow of air and fluid material. From check valve 45 the conduit extends through a suitable hole in side wall 16 and is coupled to the inlet of pump unit 31 whereby pump unit 31 is supplied with a continuous flow of air under pressure. The discharge end of pump unit 31 is connected to a hose 39 extended upwardly and over partition 25. Hose 39 has a downwardly open exit located in supply chamber 27 below level 29. Pump unit 31 has a fluid material inlet 41 for directing fluid material 22 in reservoir chamber 26 into the stream of air passing through pump unit 31 whereby pump unit 31 removes fluid material 22 from reservoir chamber 26 and discharges the fluid material into supply chamber 27 through hose 39. Downstream of gauge 37 a conduit 42 supplies air under pressure to a manifold 43 which has an enclosed chamber to provide a constant supply of air under pressure to a plurality of pump units, such as pump unit 32. A metering valve 44 similar to valve 40 is connected to the manifold outlet to regulate the rate of flow of air to pump unit 32. Metering valve 44 is adjustable to vary the rate of flow of air through the pump unit 32. Downstream of metering valve 44 is a check valve 46 which prevents reverse flow of air back through the metering valve 44 and manifold 43. Check valve 46 is coupled to the air inlet of pump unit 32 by a conduit 47 located on top of housing top wall 18. A downwardly projected inlet conduit 48 is connected to the inlet opening of pump unit 32. The lower open end of conduit 48 is below the level 29 of fluid material 22 in supply chamber whereby upon movement of air through pump unit 32, fluid material is drawn upwardly from supply chamber 27 into pump unit 32 and discharged into moving air which carries the fluid material to discharge means 12.

FIGURE 2 shows pump unit 32 comprising a tubular body 49 having a longitudinal passage 51. A sleeve 52 of material having low friction characteristics, as Teflon, is removably inserted in the discharge portion of passage 51 so that it can be removed for purposes of cleaning and maintenance. The low friction characteristic of the material of the sleeve prevents a static build up of fluid material as epoxy resin, in the longitudinal passage of the sleeve. Sleeve 52 insures a smooth and continuous flow of epoxy resin through the pump unit 32. The longitudinal passage in sleeve 52 has a central venturi throat 53. The opposite ends of the longitudinal passage of sleeve 52 taper outwardly in opposite directions providing the sleeve with a longitudinal venturi passage. Sleeve 52 is maintained in alignment and assembled relation with body 49 by an inwardly directed flange 54 on the discharge end of body 49. The discharge end also has a reduced external diameter for accommodating the end of tubular conduit 33. A flat ring 55 positioned about conduit 33 holds the conduit on the discharge end of body 49.

A coupling 56 threaded into the inlet end of body 49 is connected to pipe 47 to supply pump unit 32 with a constant and continuous amount of air under pressure. Coupling 56 has a longitudinally projected cone shaped nose 57 located in the longitudinal passage 51 of body 49 in longitudinal alignment with the venturi passage in sleeve 52. A tapered longitudinal passage 58 extended through coupling 56 opens at the forward end of nose 57 in an orifice 59 located adjacent the forward end of sleeve 52. Body 49 has a downwardly projected boss 61 located below nose 57. Boss 61 has a material inlet passage 62 open to longitudinal passage 51. As shown in FIGURE 3, boss 61 projects downwardly through a hole 63 in top wall 18 of the housing. A retainer 64, as a nut or split ring, positioned about boss 61 is used to secure body 49 to top wall 18. Inlet conduit 48 threaded into boss 61 projects downwardly therefrom through the top level 29 of the fluid material 22 in supply chamber 27. The distance D between top level 29 of the fluid material in supply chamber 27 and the longitudinal passage 51 is relatively small, preferably two inches or less, to reduce the suction head of the pump unit. This suction head is maintained substantially constant because top level 29 of fluid material in supply chamber 27 does not change as fluid material is being withdrawn by pump unit 32 from the supply chamber 27. This is accomplished with pump unit 31 which operates to move fluid material from reservoir chamber 26 into the supply chamber 27 at a faster rate than that which pump unit 32 removes fluid material from the supply chamber. Excess fluid material in supply chamber 27 flows over the top of partition 25 back into the reservoir chamber.

A metered, or restricted quantity of air at atmospheric pressure is mixed with the fluid material flowing upwardly in inlet conduit 48 to prevent flooding of venturi throat 53 and eliminating pulsating flow of fluid material through the venturi throat and in tubular conduit 33. Air is permitted to flow into inlet conduit 48 through a restrictor flow control valve 66 having a calibrated adjustable member 67 regulating the air flow capacity through control valve 66. The rate of air flowing through flow control valve 66 is adjusted until the flow of fluid material from pump unit 32 is steady, continuous and uniform.

A mixture of air and fluid material is discharged from pump unit 32 as a continuous and steady stream into tubular conduit 33 used to carry the fluid material through wall 13 into the spray chamber. Conduit 33 is coupled to material discharge means 12 having a nozzle indicated generally at 68 for directing the stream of air and fluid material to a particular location.

Referring to FIGURE 4, nozzle 68 comprises an elongated body 69 having a longitudinal passage 71. The discharge end of passage 71 has an outwardly diverging taper to provide a dispersed spray pattern of fluid material leaving discharge end 73 of the nozzle. The opposite end of body 69 has a material inlet passage 74 open to the inlet end of longitudinal passage 71. The axis of passage 74 is angularly disposed at an angle of about 30 degrees with respect to the axis of passage 71. Located in axial alignment with passage 71 is an air inlet passage 76 for injecting air under pressure into the conveyed fluid material as it moves through nozzle passage 71. An air line or conduit 77 coupled to the air pressure source 34 downstream of gauge 37 and nozzle 68 is used to carry air under pressure to passage 76. Interposed in conduit 77 is a manifold 78 usable to connect additional nozzles into the spraying system. The flow rate of air from manifold 78 is controlled by a metering valve 79 connected to a check valve 82 operable to prevent the reverse flow of air and fluid material back to metering valve 79.

In use, the finely divided fluid material, as epoxy resin, is initially placed in reservoir chamber 26 and supply chamber 27. Application of air under pressure to air inlet 23 forces air up through porous filter 21, fluidizing the epoxy resin in both chambers. Air moving through pump unit 31 transports fluidized material 22 in chamber 26 into supply chamber 27 to maintain the level 29 of the fluid material in chamber 27 at constant elevation. The level 29 is maintained close to top wall 18 by allowing a constant overflow of fluid material over the linear edge 28 of partition 25 back into reservoir chamber 26.

The air pressure in conduit 38 is regulated by pressure regulator 36 so that the air supplied to pump units 31 and 32 is at a constant pressure. Metering valve 40 is adjustable to control the flow rate of air to pump unit 31 and thus regulate the amount of fluid material transferred from reservoir chamber 26 to supply chamber 27. Metering valve 44 is used to control the flow rate of air to the transfer pump unit 32. Referring to FIGURE 2, the air flowing through passage 58 is discharged through orifice 59 into the inlet of venturi passage of sleeve 52. The air moving from nose 57 creates a vacuum in the annular chamber 82 surrounding the nose. The material inlet passage 62 opens to annular chamber 82 so that the suction pressure in chamber 82 draws fluidized material up through inlet conduit 48 and into the air moving through the venturi throat. Sleeve 52 being of a low friction material does not accumulate the powdered material. The flow of fluid material through sleeve 52 is uniform, constant and continuous.

As shown in FIGURE 3, restrictor valve or flow control valve 66 is used to allow a limited amount of air into the inlet conduit 48. This additional air mixes with the fluid material to prevent flooding of the venturi throat and a pulsating flow of fluid material through pump unit 32. Member 67 can be adjusted to regulate the flow of air through restrictor valve 66 to provide uniform and optimum flow conditions.

The level 29 of fluid material in supply chamber 27 is maintained close to the venturi passage of pump unit 32 to reduce the suction head and the time necessary to draw fluid material up inlet conduit 48 into the air moving through pump unit 32. When the distance D is large, an excessive time lapse results in supplying fluid material to the air moving through pump unit 32. The nozzle 68 will not receive uniform amounts of fluid material resulting in thin coating areas on the sprayed part. If flow control valve 66 is not used a pulsating condition is obtained. This results in non-uniform coating of the sprayed part.

As the fluid material moves through conduit 33 the carrying air tends to centralize the material in a continuous stream concentrated in the center area of the tubular conduit. As the material flows into the longitudinal passage 71 of nozzle 68 air flowing from inlet passage 76 tends to disturb the pattern of the fluidized material creating turbulence and spreading the material in the longitudinal passage of the nozzle as indicated in FIGURE 1. The outer section of passage 71 has diverging taper 72 to further disperse the fluid material by increasing the area of the spray pattern. The air introduced into the nozzle passage 71 through inlet passage 76 also increases the velocity of the fluid material discharged from the nozzle. This velocity may be regulated with metering valve 79 to change the range of the fluid material discharged from nozzle 68.

In terms of a method of transporting and dispensing continuous and uniform concentrations of fluid materials to a particular location the invention comprises providing a reservoir chamber 26 and a supply chamber 27 for storing the fluid material to be discharged to the selected location. The fluid material in reservoir chamber 26 is continuously withdrawn from the reservoir chamber 26 and discharged into the supply chamber 27 by pump unit 31 to maintain the level 29 of the fluid material in supply chamber at a fixed elevation. Pump unit 31 moves material from the reservoir chamber 26 into the supply chamber 27 at a rate faster than which the material is withdrawn from the supply chamber. Excess fluid material flows over the top of the partition 25 back into the reservoir chamber.

The fluid material in the supply chamber is withdrawn or moved from the supply chamber by pump unit 32 at a continuous and uniform rate and directed toward the material discharge means 12. As the fluid material is withdrawn from supply chamber a restricted amount of air is allowed to mix with this fluid material. Flow control valve 66 is used to regulate the amount of air mixed with the fluid material moving into the pump unit 32. The air moving through pump unit 32 is used to continuously and uniformly carry fluid material from the pump unit 32 to nozzle 68 used to direct air and fluid material at a continuous and uniform rate to a selected location. The velocity and dispersion pattern of the fluid material discharged from nozzle 68 is controlled by forcing air through the nozzle to accelerate the fluid material and to disperse the spray pattern of the fluid material discharged from the nozzle.

The invention is defined in the following claims.

The embodiments of the invention in which an exclusive property or privilege is claimed are defined as follows:

1. An apparatus for dispensing particulate material comprising:
    (a) tank means having a first chamber and a second chamber, each chamber storing particulate material means at the bottom of both the first chamber and the second chamber for introducing a gas upwardly into the particulate material thereby fluidizing said material in each chamber,
    (b) first material transporting means operable to move fluidized material from the first chamber into the second chamber to maintain a selected level of fluidized material in the second chamber,
    (c) means for directing fluidized material in at least one direction, and
    (d) second material transporting means having an inlet passage located below the level of fluidized material in the second chamber and an outlet passage above said level connected to the directing means, said second material transporting means including a pump operable to move fluidized material from the second chamber to the directing means and discharge said fluidized material from the directing means at a rate slower than the first material transporting means moves fluidized material into the second chamber.

2. An apparatus for dispensing fluid material comprising: a tank means having a first chamber and a second chamber, each chamber storing fluid material, first material, transporting means operable to move fluid material from the first chamber into the second chamber to maintain a selected level of fluid material in the second chamber, means for directing fluid material in at least one direction, and second material transporting means having an inlet passage located below the level of the fluid material in the second chamber and an outlet passage connected to the directing means, said second material transporting means operable to move fluid material from the second chamber to the directing means and discharge said fluid material from the directing means, said second material transporting means comprising a venturi pump unit having a venturi passage including a throat and a material inlet passage open at one end to the venturi passage upstream of said throat, the opposite end of said inlet passage located below the level of fluid material in said second chamber, conduit means connected to said venturi passage and directing means, and means for supplying air under pressure to the venturi passage whereby fluid material is drawn up the inlet passage, moved through the conduit means and discharged from the nozzle means.

3. The apparatus of claim 2 wherein said venturi passage is formed with a sleeve of low friction material.

4. The apparatus of claim 2 including air passage means open to the material inlet passage.

5. The apparatus of claim 4 including means for adjusting the size of the air passage means to restrict the flow of air into the material inlet passage.

6. The apparatus of claim 1 wherein said second material transporting means comprises a pump unit, fluid material inlet passage means connected to the pump unit, said inlet passage means having a portion open to the fluid material in the second chamber below the level of the fluid material in the second chamber, conduit means connected to the pump unit and directing means for carrying fluid material from the pump unit to the directing means, and air passage means open to said inlet passage means allowing a restricted flow of air into said inlet passage means during movement of fluid material through said inlet passage means to the pump unit.

7. The apparatus of claim 2 wherein said directing means is a nozzle having a first inlet passage coupled to said second material transporting means, a discharge passage open at one end and open to the inlet passage, a second inlet passage open to the discharge passage, and means for supplying air under pressure to said second inlet passage to assist in moving material through said discharge passage.

8. The apparatus of claim 7 wherein the open end section of said discharge passage diverges outwardly.

9. The apparatus of claim 2 wherein said first material transporting means comprises a venturi pump unit operable in response to flowing air under pressure to move material from the first chamber to the second chamber.

10. A method of supplying a discharge means with continuous and uniform concentrations of particulate material comprising storing particulate material in two separate chambers, continuously introducing air to the bottom of said chambers to suspend said particulate material in each chamber in moving air, maintaining a substantially constant level of suspended particulate material in one chamber by moving suspended particulate material from the other chamber into the one chamber, withdrawing upwardly a continuous and uniform amount of suspended particulate material from said one chamber at a rate less than the amount of suspended particulate material moved into said one chamber, carrying said withdrawn fluid material to discharge means, and dispensing the fluid material to a selected location.

11. The method defined in claim 10 further characterized by allowing a restricted amount of air to mix with the fluid material withdrawn from the one chamber.

12. The method defined in claim 10 including supplying the discharge means with air under pressure to increase movement of fluid material from the discharge means.

References Cited
UNITED STATES PATENTS

| | | | |
|---|---|---|---|
| 2,509,984 | 5/1950 | Morrow | 302—52 |
| 2,774,636 | 12/1956 | Whitlock | 302—17 |
| 2,900,138 | 8/1959 | Strate | 302—11 |

ANDRES H. NIELSEN, *Primary Examiner.*